United States Patent
O'Neill

(10) Patent No.: US 6,202,670 B1
(45) Date of Patent: Mar. 20, 2001

(54) PIEZOELECTRIC ACTUATED POPPET VALUE TO MODULATE PILOT PRESSURES AND CONTROL MAIN VALVE ACTIVATION

(75) Inventor: William N. O'Neill, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/538,841

(22) Filed: Mar. 30, 2000

Related U.S. Application Data

(62) Division of application No. 09/314,063, filed on May 18, 1999.

(51) Int. Cl.[7] .................................................. G05D 16/20
(52) U.S. Cl. ................... 137/82; 137/625.5; 251/129.06
(58) Field of Search ................. 137/82, 625.5; 251/129.06

(56) References Cited

U.S. PATENT DOCUMENTS

| | | | |
|---|---|---|---|
| 2,912,008 | * | 11/1959 | Blackburn ................... 137/625.62 X |
| 4,825,894 | * | 5/1989 | Cummins .................... 251/129.06 X |
| 5,085,125 | * | 2/1992 | Emo et al. .................. 251/129.06 X |
| 5,148,735 | * | 9/1992 | Velatovac .................... 251/129.06 X |

FOREIGN PATENT DOCUMENTS

| | | | |
|---|---|---|---|
| 62-159878 | * | 7/1987 | (JP) ................................. 251/129.06 |
| 3-234981 | * | 10/1991 | (JP) ................................. 251/129.06 |

* cited by examiner

*Primary Examiner*—Gerald A. Michalsky
(74) *Attorney, Agent, or Firm*—Howard & Howard

(57) ABSTRACT

A piezoelectric actuated poppet valve is disclosed. The piezoelectric valve generally includes a valve body having multiple passages that provide fluid flow paths through the valve body. Flow through the flow paths is controlled by the position of a poppet valve that is slidably received in a fluid-tight manner in an interior space within the valve body. A piezoelectric actuator is secured to the valve body and contacts the poppet valve. Actuation of the piezoelectric actuator moves the poppet valve within the interior space. Movement of the poppet valve within the interior space controls flow through the fluid flow paths in the valve body.

7 Claims, 4 Drawing Sheets

PIEZOELECTRIC ACTUATED POPPET VALUE TO MODULATE PILOT PRESSURES AND CONTROL MAIN VALVE ACTIVATION

This is a divisional application of application Ser. No. 09/314,063 filed May 18, 1999.

TECHNICAL FIELD

This invention relates generally to hydraulic valves, and, more specifically, to the control of a hydraulic valve by a piezoelectric actuated poppet valve.

BACKGROUND ART

Piezoelectric materials respond to exposure to an electrical field by deforming in a manner that varies directly with the applied potential difference. The direction of deformation, namely an increase or a decrease in length, is dependent on the polarity of the electrical field and the arrangement of the piezoelectric material. Generally, a piezoelectric element is formed by stacking a series of discs of the piezoelectric material wherein the discs are interweaved with electrodes to enable the discs to be exposed to an electrical field.

Piezoelectric elements have the advantage of being able to sustain very high cycle frequencies and to respond nearly instantaneously to a change in the electrical field. By way of example, a piezoelectric element formed of a properly oriented stack of discs can respond to a negative polarity by expanding along a longitudinal axis of the stack of discs within microseconds. For example, a stack of discs approximately 150 mm long will expand approximately 75 μm.

In a typical hydraulic control system, a hydraulic valve includes an internal spool having at either end of it a control volume. High hydraulic pressure is metered into each of the control volumes at each end of the spool. Movement of the spool is used to control the output of the hydraulic valve. Movement of the spool within the hydraulic valve is often accomplished by modulation of a pilot pressure, which is also fed into each control volume at each end of the spool. The pilot pressure is under a lower pressure than the high hydraulic pressure. Thus, movement of the spool within the hydraulic valve can be accomplished by small changes in the pilot pressure at either end of the spool. Typically, operator input is used to regulate the pilot pressure to either end of the spool in order to effect movement of the spool within the valve which in turn causes movement of, for example, a machine implement.

One disadvantage with current hydraulic valves is their response time to operator input. It would be advantageous to have a hydraulic valve that responded nearly instantaneously to operator inputs. The very rapid response time of piezoelectric materials makes them ideal candidates for incorporation into a hydraulic control valve system.

The present invention is directed to overcoming one or more of the problems set forth above.

DISCLOSURE OF THE INVENTION

In one aspect of this invention, a piezoelectric valve is disclosed. The piezoelectric valve includes a valve body having a first end opposite a second end, first multiple passages in fluid communication with a first chamber adjacent the first end and second multiple passages in fluid communication with a second chamber adjacent the second end, an interior space defined between the first chamber and the second chamber, a poppet valve received within the interior space in a fluid tight fit and slideable within the interior space, the poppet valve having a first end opposite a second end, a piezoelectric actuator contacting the poppet valve, the piezoelectric actuator sliding the poppet valve within the interior space when the piezoelectric actuator is actuated, a spring biasing the second end of the poppet valve into a valve seat when the piezoelectric actuator is not actuated and permitting fluid flow through the first multiple passages and the first chamber, thereby establishing a first fluid flow path through the valve body, the spring preventing fluid flow through the second multiple passages and the second chamber, and actuation of the piezoelectric actuator moving the poppet valve away from the valve seat and compressing the spring to permit fluid flow through the second multiple passages and the second chamber thereby establishing a second flow path through the valve body and preventing fluid flow through the first flow path.

In another aspect of this invention, a method for controlling flow of fluid through a valve body is disclosed. The method includes the steps of providing a valve body having a first chamber and a second chamber with an interior space defined between the first and second chambers, providing first multiple passages through the valve body and in fluid communication with the first chamber and second multiple passages through the valve body and in fluid communication with the second chamber, positioning a poppet valve within the interior space in a slideable and fluid-tight fit, positioning a piezoelectric actuator to contact the poppet valve, biasing the poppet valve in a first direction when the piezoelectric actuator is not actuated, thereby permitting fluid flow through the first multiple passages while preventing fluid flow through the second multiple passages, and actuating the piezoelectric actuator to move the poppet valve in a second direction opposite the first direction to thereby permitting fluid flow through the second multiple passages while preventing fluid flow through the first multiple passages.

BRIEF DESCRIPTION OF THE DRAWINGS

For a better understanding of the present invention, reference may be made to the accompanying drawings in which.

BEST MODE FOR CARRYING OUT THE INVENTION

Figure 1:
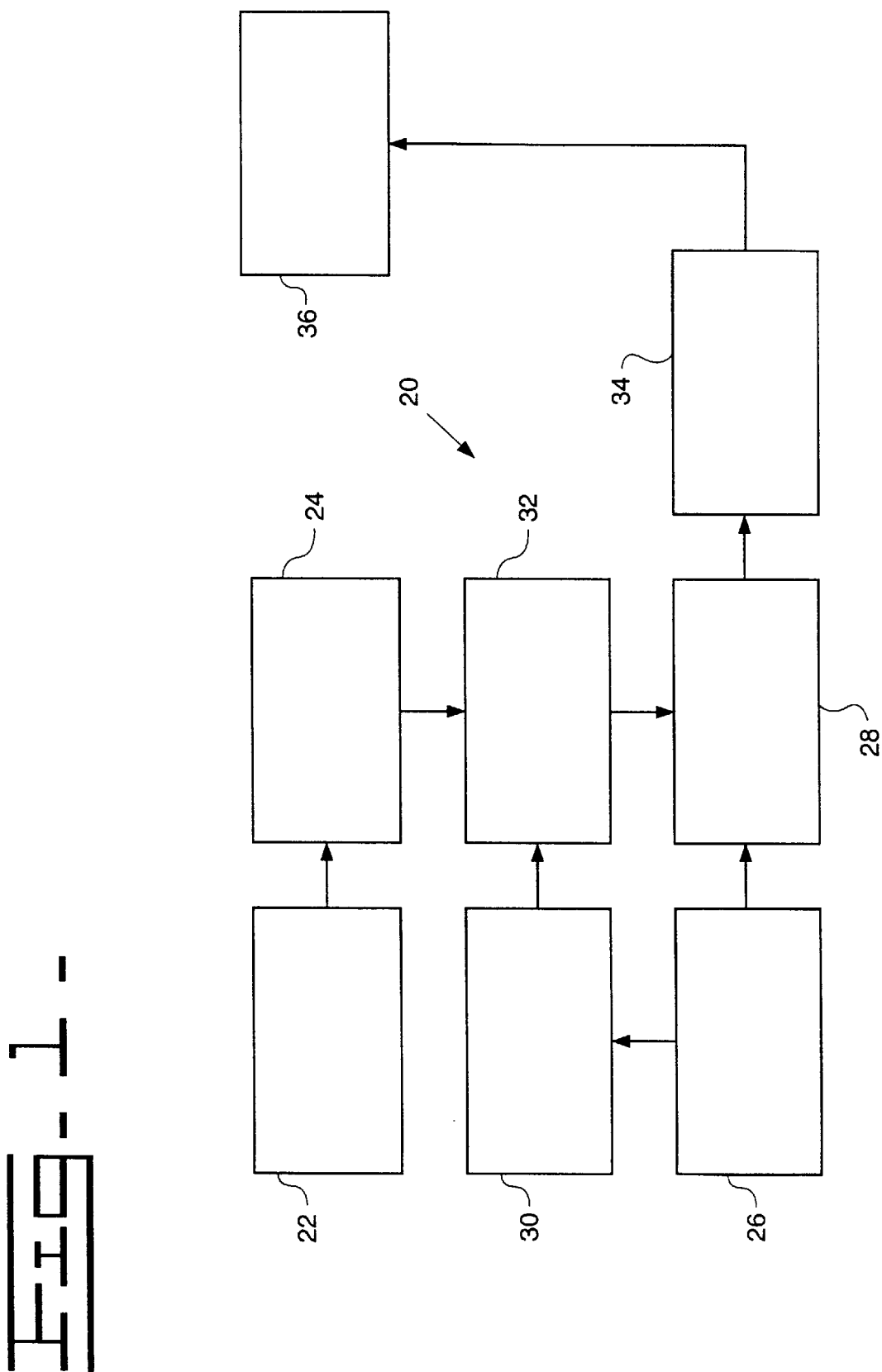
FIG. 1 is a schematic view of a hydraulic control system incorporating piezoelectric valves designed in accordance with the present invention.

A schematic view of a hydraulic control system is generally indicated by numeral 20 in FIG. 1. The hydraulic control system 20 is used to control a variety of implements on a machine and machine functions.

Hydraulic control system 20 includes a number of hand controls 22 for translating movement of an operator's hands into movement of an implement. Generally, hand controls 22 comprise electronic hand controls that transform movements of an operator's hands into electrical signals that are sent to an electronic control computer 24. Electronic computer 24 receives the electrical signals from hand controls 22 and transmits controlled electrical signals to a variety of actuators including a plurality of piezoelectric valves 32.

A hydraulic pump 26 takes in rotary motion from an engine (not shown) and puts out high hydraulic pressure. Hydraulic pump 26 is connected to a hydraulic reservoir (not shown) as is known in the art. Hydraulic valves 28 receive the high hydraulic pressure from hydraulic pump 26 and controlled low pilot pressure from piezoelectric valves 32. As discussed above, hydraulic valves 28 include a spool (not shown) and control volumes at each end of the spool. High hydraulic pressure from hydraulic pump 26 and low pilot pressure from piezoelectric valves 32 are fed into each control volume to control the position of the spool in the hydraulic valve 28. Hydraulic pump 26 sends high hydraulic pressure to a hydraulic pressure-reducing valve 30 which puts out the lower pilot pressure to piezoelectric valves 32. Movement of hydraulic valves 28 is controlled by modulation of the pilot pressure supplied from piezoelectric valves 32.

Hydraulic valves 28 put out controlled high pressure to a plurality of hydraulic actuators 34 such as motors and hydraulic cylinders. Hydraulic actuators 34 take in the controlled high hydraulic pressure from hydraulic valves 28 and exert mechanical force to move mechanical machine parts and implements 36. Small changes in pilot pressure in either of the control volumes of hydraulic valve 28 can be utilized to shift the spool in hydraulic valve 28 in a first direction or a second direction. Shifting of the spool in hydraulic valve 28 causes the movements in mechanical machine parts and implements 36.

Figure 2:
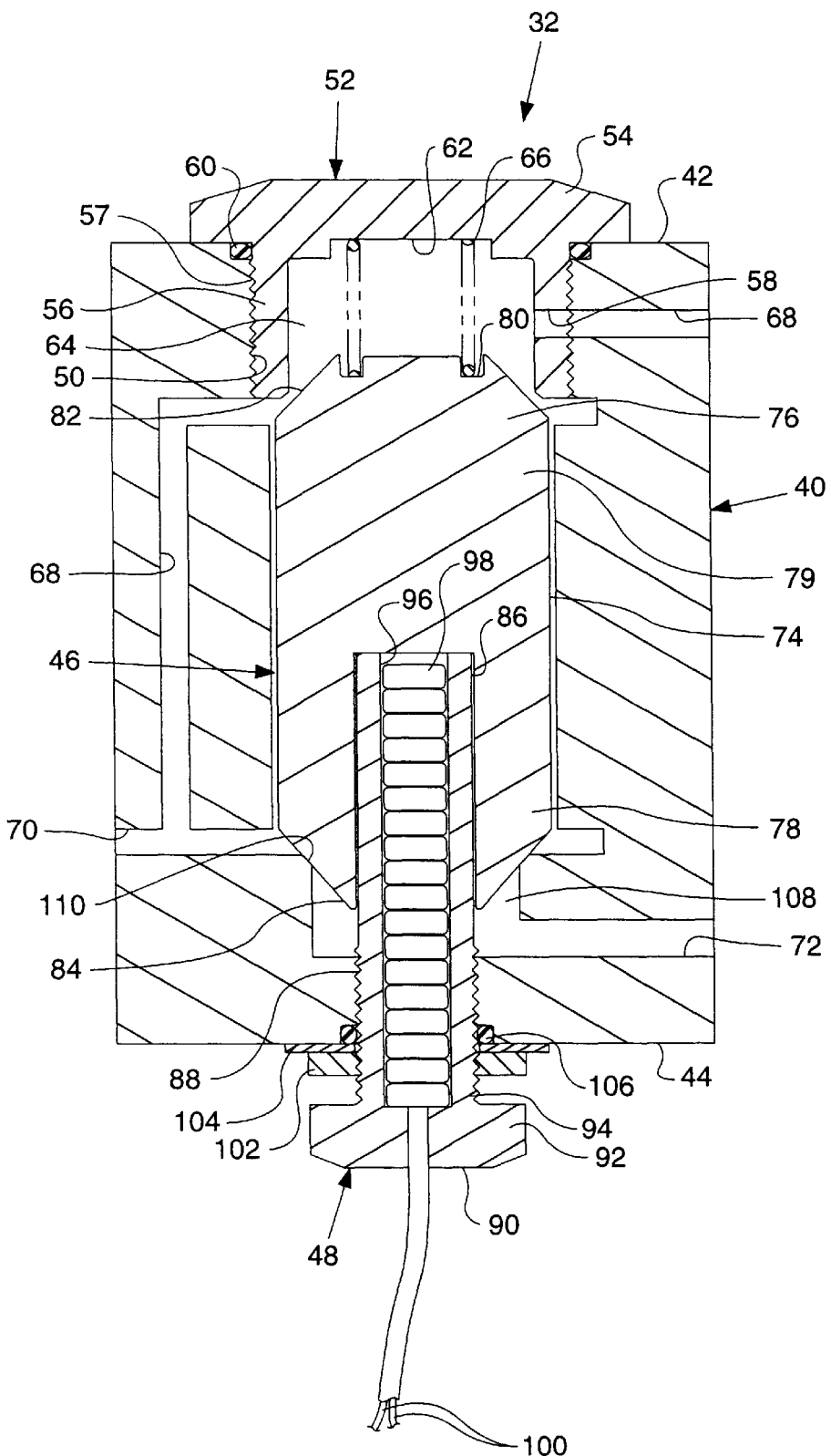
FIG. 2 is a cross-sectional view of a piezoelectric valve designed according to the present invention.

Referring now to FIG. 2, a piezoelectric valve designed according to the present invention is shown generally indicated by numeral 32. Piezoelectric valve 32 includes a valve body 40 having a first end 42 and a second end 44 that is opposite the first end 42. Piezoelectric valve 32 further includes a poppet valve 46 and a piezoelectric actuator 48.

First end 42 of valve body 40 includes a threaded aperture 50 for receiving a hollow bolt 52. Hollow bolt 52 comprises a head 54 adjacent a cylindrical portion 56 having external threads 57. Cylindrical portion 56 with external threads 57 is received in threaded aperture 50. Cylindrical portion 56 further includes a passage 58. A seal 60 is received between head 54 and hollow bolt 52 to seal one end of a first chamber 64, a portion of which is formed in cylindrical portion 56. A spring recess 62 adjacent first chamber 64 receives one end of a spring 66.

A first passage 68 in valve body 40 is in communication with passage 58 in cylindrical portion 56. Passage 58 permits communication between first passage 68 and first chamber 64. Additionally, first passage 68 communicates with a second passage 70 adjacent second end 44 of valve body 40.

Valve body 40 further includes a third passage 72 adjacent second end 44. Third passage 72 is in fluid communication with a second chamber 108 adjacent second end 44 of valve body 40. Valve body 40 further includes an interior space 74 between first end 42 and second end 44. Interior space 74 receives poppet valve 46.

Poppet valve 46 includes a first end 76 and a second end 78 opposite first end 76 with a body 79 between them. A first recess 80 is located in first end 76 and receives a portion of a spring 66. First end 76 further includes a first beveled surface 82. Second end 78 includes a second beveled surface 84. An actuator recess 86 extends from second end 78 into body 79. Actuator recess 86 is for receiving a portion of piezoelectric actuator 48. Poppet valve 46 is slideable within interior space 74 in a fluid-tight manner.

The second end 44 of valve body 40 includes a threaded aperture 88 for receiving a portion of piezoelectric actuator 48. Piezoelectric actuator 48 comprises a hollow bolt 90 having a head 92, a threaded portion 94, and a sleeve 96. Threaded portion 94 is received in threaded aperture 88. Sleeve 96 extends into actuator recess 86 of poppet valve 46. Sleeve 96 receives a piezoelectric element 98. The piezoelectric element 98 is preferably embedded or potted in the sleeve 96 with sealing material, e.g., plastic, that provides protection and allows the hollow bolt 90, head 92, threaded portion 94, and a sleeve 96 to function as an assembly to form the piezoelectric actuator 48.

Piezoelectric element 98 is connected to a pair of wire leads 100. Wire leads 100 receive electric signals from electronic control computer 24 to actuate or deactuate the piezoelectric actuator 48.

Piezoelectric element 98, as discussed above, generally comprises a stack of disks of piezoelectric material, such as lead zirconate titanate. Piezoelectric element 98 is formed of a stack of these disks interweaved with electrodes (not shown) connected to wire leads 100. Actuation of the piezoelectric actuator 48 causes piezoelectric element 98 to expand or contract along its longitudinal axis depending on the polarity of the electrical signal and the arrangement of the disks.

A jam nut 102 is received on threaded portion 94 to secure piezoelectric actuator 48 relative to second end 44 and poppet valve 46. A washer 104 and a seal 106 are received adjacent jam nut 102 and serve to seal threaded aperture 88 from the outside elements. Piezoelectric actuator 48 extends through second chamber 108. Second chamber 108 includes a valve seat 110 for receiving second beveled surface 84 of poppet valve 46.

Spring 66 normally biases poppet valve 46 into valve seat 110 in the position, shown in FIG. 2, when piezoelectric actuator 48 is not actuated. That is, normally second beveled surface 84 is against valve seat 110 thus preventing fluid communication through third passage 72, second chamber 108 and second passage 70. First passage 68 is normally in fluid communication with first chamber 64 and second passage 70 thus providing a first flow path through valve body 40.

In a preferred embodiment, applying an electrical current through wire leads 100 to piezoelectric actuator 48 causes piezoelectric element 98 to expand along its longitudinal axis. For example, a 150 mm long piezoelectric element 98 will generally have a stroke length of approximately 75 $\mu$m. Movement of this amount is sufficient to move poppet valve 46 and push first beveled surface 82 against cylindrical portion 56 thereby preventing fluid flow through the first flow path. In addition, this movement of poppet valve 46 toward first end 42 opens fluid communication between second passage 70, second chamber 108, and third passage 72 thereby creating a second flow path through valve body 40.

Once the electric current to piezoelectric actuator 48 is turned off and the charge placed on the piezoelectric material is bleed-off and discharged, spring 66 returns poppet valve 46 to the position, shown in FIG. 2, thereby opening first flow path and closing second flow path.

The disclosed piezoelectric valve 32 could be used in a number of ways in hydraulic control system 20 to control, for example, the distribution of pilot pressure. In one use, each control volume of the spool in hydraulic valve 28 would be in fluid communication with second passage 70 of piezoelectric valve 32 and pilot pressure would be supplied to first passage 68 of piezoelectric valve 32. Thus, initially the spool would be centered within hydraulic valve 28 because each end of the spool would be receiving the same pilot pressure from its associated piezoelectric valve 32. Third passage 72 would be connected to the hydraulic fluid reservoir. To shift the spool within hydraulic valve 28 one of the piezoelectric valves 32 would be actuated through piezoelectric actuator 48. Actuation of a piezoelectric valve 32 causes poppet valve 46 to shift toward first end 42 of valve body 40, thereby closing the first flow path and opening the second flow path. Thus, permitting an outflow of pressure from the associated control volume of the spool in hydraulic valve 28 to the hydraulic pump reservoir (not shown) through the second flow path. Turning off electrical actuation of piezoelectric actuator 48 enables spring 66 to return poppet valve 46 to the position shown in FIG. 2 thus stabilizing the spool in hydraulic valve 28 at a new position.

Figure 3:
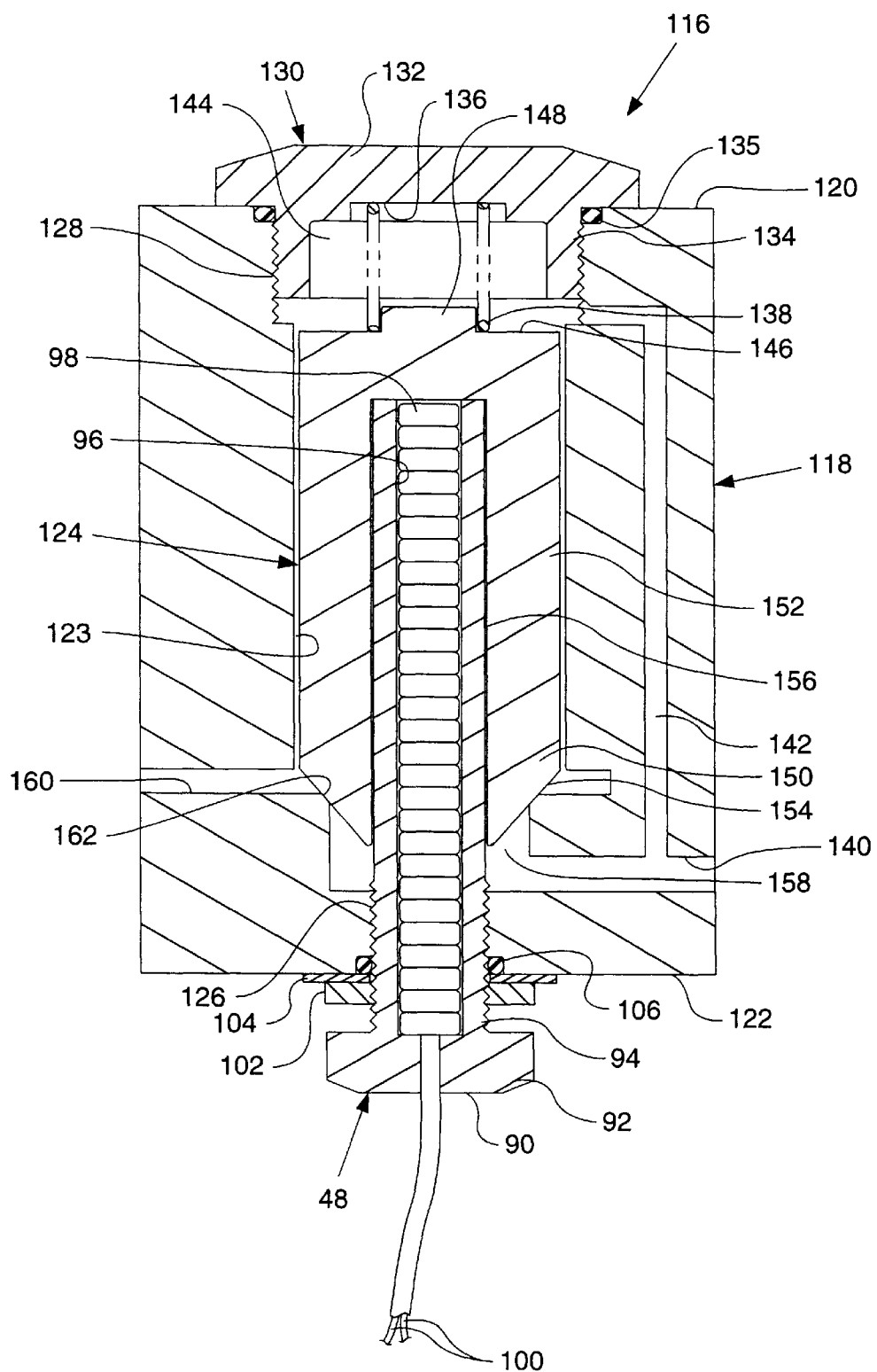
FIG. 3 is a cross-sectional view of another piezoelectric valve designed according to the present invention.

In FIG. 3, a cross-sectional view of an alternative embodiment of a piezoelectric valve is generally shown by numeral 116. Piezoelectric valve 116 includes a valve body 118 having a first end 120 opposite a second end 122. An interior space 123 is located within valve body 118. Interior space 123 receives a poppet valve 124, which is slideable within interior space 123 in a fluid-tight manner.

Second end 122 of valve body 118 includes a threaded aperture 126 for receiving cylindrical portion 94 of piezoelectric actuator 48. Piezoelectric actuator 48, shown in FIG. 3, functions identically to the piezoelectric actuator 48, shown in FIG. 2.

First end 120 includes a threaded aperture 128 for receiving a plug 130. Plug 130 includes a head 132 adjacent a cylindrical portion 134. Cylindrical portion 134 is received in threaded passage 128. A seal 135 is received between head 132 and first end 120 to seal threaded aperture 128 from the outside elements.

A spring recess 136 is located within cylindrical portion 134 and receives a portion of a spring 138. Spring 138 biases poppet valve 124 toward second end 122.

Valve body 118 includes a first passage 140 that is in fluid communication with a second passage 142, a second chamber 158 and a third passage 160. Second passage 142 is in fluid communication with a first chamber 144 defined by spring recess 136 and poppet valve 124.

Poppet valve 124 includes a first end 146 having a boss 148 for retaining spring 138. Opposite first end 146 is a second end 150. A body 152 joins first end 146 to second end 150. Second end 150 includes a beveled surface 154 and an actuator recess 156 for receiving sleeve 96 and piezoelectric element 98 of piezoelectric actuator 48. The retained spring 138 normally biases beveled surface 154 against a valve seat 162 in valve body 118. Thus, normally there is no fluid communication between first passage 140, second chamber 158, and third passage 160.

When piezoelectric actuator 48 is actuated by an electrical current, piezoelectric element 98 expands and moves poppet valve 124 toward first end 120 of valve body 118. Thus, enabling fluid communication between third passage 160, second chamber 158 and first passage 140.

In use, piezoelectric valve 116 can be used as a variable size orifice to provide either supply pilot pressure to a hydraulic valve 28 or to enable release of hydraulic pressure from a hydraulic valve 28. The function of piezoelectric valve 116 will depend upon the portions of the hydraulic control system 20 that are connected to third passage 160 and first passage 140. In piezoelectric valve 116, a second passage 142 permits equalization of pressure on both ends of poppet valve 124.

Figure 4:
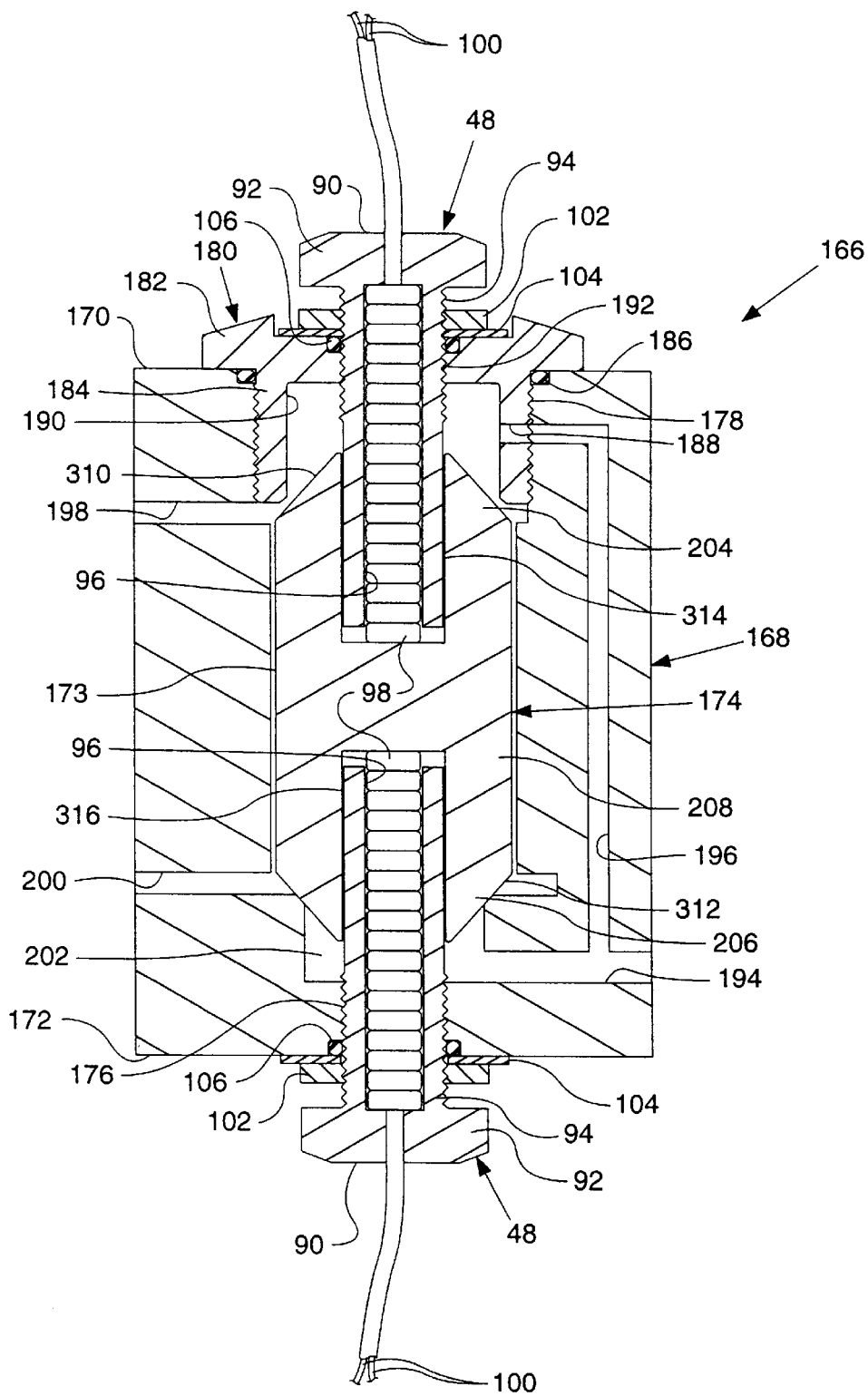
FIG. 4 is a cross-sectional view of another piezoelectric valve designed according to the present invention.

FIG. 4 is a cross-sectional view of an alternative embodiment of a piezoelectric valve 166. Piezoelectric valve 166 includes two piezoelectric actuators 48 that are identical to those disclosed above in FIG. 2 and FIG. 3.

Piezoelectric valve 166 includes a valve body 168 having a first end 170 opposite a second end 172. An interior space 173 is located between first end 170 and second end 172. Interior space 173 receives a poppet valve 174, which is slideable in a fluid-tight manner within interior space 173.

Second end 172 of valve body 168 includes a threaded aperture 176 for receiving threaded portion 94 of piezoelectric actuator 48 in a manner similar to that shown in FIG. 2.

First end 170 includes a threaded passage 178 for receiving a plug 180. Plug 180 includes a head 182 adjacent a cylindrical portion 184. Cylindrical portion 184 is received within threaded aperture 178. A seal 186 is received between head 182 and first end 170 to seal out outside elements.

Plug 180 further includes a threaded aperture 192 for receipt of threaded portion 94 of piezoelectric actuator 48 in a manner similar to that shown in FIG. 2. Cylindrical portion 184 includes a passage 188 that is in fluid communication with a first chamber 190 located within cylindrical portion 184.

Valve body 168 includes a first passage 194 adjacent second end 172. First passage 194 is in fluid communication with a second passage 196, a second chamber 202, and a fourth passage 200. Second passage 196 is in fluid communication with first chamber 190 and a third passage 198.

Poppet valve 174 includes a first end 204 opposite a second end 206. First end 204 and second end 206 are separated by a body 208. First end 204 includes a first beveled surface 310 and second end 206 includes a second beveled surface 312. A first actuator recess 314 extends from first end 204 into body 208. First actuator recess 314 receives the sleeve 96 of a first piezoelectric actuator 48. A second actuator recess 316 extends from second end 206 into body 208 and receives a sleeve portion 96 of a second piezoelectric actuator 48.

As shown in FIG. 4, interior space 173 and poppet valve 174 are sized such that poppet valve 174 is centered in interior space 173 and there is a first fluid flow path through valve body 168 between first passage 194 and third passage 198, and a second fluid flow path through valve body 168 between first passage 194 and fourth passage 200. Thus, piezoelectric valve 166 normally has two fluid flow paths. Actuation of a first piezoelectric actuator 48 with a first electrical current causes expansion of its piezoelectric element 98. Simultaneous actuation of the second piezoelectric actuator 48 with a second electrical current causes compression of its piezoelectric element 98. The net result is a shift in poppet valve 174 toward either first end 170 or second end 172. The shift closes off either the first or second flow path and further opens the other flow path. Removing the electrical currents will allow poppet valve 174 to return to a centered position, as shown in FIG. 4.

In use, third passage 198 may be connected to one control volume of a spool in hydraulic valve 28 while fourth passage 200 is connected to the other control volume of the spool in hydraulic valve 28. Pilot pressure and high hydraulic pressure would be supplied to both control volumes of the spool in hydraulic valve 28 by open orifices. First passage 194 would be connected to the hydraulic fluid reservoir. Thus, when neither piezoelectric actuator 48 is activated, as shown in FIG. 4, there will be a slow leak of hydraulic pressure from hydraulic valve 28 through piezoelectric valve 166, but the loss of hydraulic pressure from hydraulic valve 28 will be equal on either side of the spool in hydraulic valve 28. Actuation of the piezoelectric actuators 48 by the first and second electrical currents will cause a shift in poppet valve 174 thereby closing off one of the fluid flow paths from one of the control valves of the spool in hydraulic valve 28 and increasing the fluid flow through the other flow path associated with the other control volume of the spool in hydraulic valve 28, thereby enabling spool of hydraulic valve 28 to shift.

Industrial Applicability

A piezoelectric valve 32 enables a pilot pressure to a hydraulic valve 28 to be modulated by an electrical input. Piezoelectric valve 32 includes a valve body 40 having a plurality of passages that create a plurality of fluid flow paths through the valve body 40. A poppet valve 46 is located within an interior space 74 within the valve body 40. Poppet valve 46 is slideable within interior space 74 in a fluid-tight manner. Poppet valve 46 receives a piezoelectric actuator 48. Application of an electrical current to piezoelectric actuator 48 causes poppet valve 46 to shift within interior space 74 thereby opening some fluid flow paths and closing other fluid flow paths. The opening and closing of flow paths permit flows into or out of control volumes on either end of a spool located in a hydraulic valve 28 that is connected to the piezoelectric valve 32. Thus, the present invention provides a compact and simple valve that can rapidly alter, for example, the pilot pressure supplied to a hydraulic valve 28 to control movement of a spool within hydraulic valve 28 and thereby hydraulically shift a machine part or implement 36.

Other aspects, objects, and features of the present invention can be obtained from a study of the drawings, the disclosure, and the appended claims.

What is claimed is:

1. A piezoelectric valve comprising:
   a valve body having a first end opposite a second end, a first fluid flow path through said valve body and a second fluid flow path through said valve body, an interior space defined between said first end and said second end;
   a poppet valve receivable within said interior space in a fluid tight fit and slidable within said interior space, said poppet valve having a first end opposite a second end;
   a first piezoelectric actuator in contact with said first end of said poppet valve;
   a second piezoelectric actuator in contact with said second end of said poppet valve;
   wherein said poppet valve is centered in said interior space when said first piezoelectric actuator and said second piezoelectric actuator are not actuated, thereby permitting fluid flow through said first fluid flow path and said second fluid flow path and when said first piezoelectric actuator is actuated with a first electrical current expanding a piezoelectric element in said first piezoelectric actuator and said second piezoelectric actuator is actuated with a second electrical current compressing a piezoelectric element in said second piezoelectric actuator, said poppet valve is thereby shifted by said first and said second piezoelectric actuators and fluid flow is prevented through one of said first and said second fluid flow paths while increasing fluid flow through an other one of said first and said second fluid flow paths.

2. A piezoelectric valve as recited in claim 1, wherein said second end of said valve body includes a threaded aperture and said second piezoelectric actuator further comprising a jam nut, and a hollow bolt, having a head, a threaded portion and a sleeve and said piezoelectric element is receivable in said sleeve and said threaded portion is engageable with said threaded aperture and said jam nut is positioned on said threaded portion adjacent said second end of said valve body to secure said piezoelectric actuator to said second end of said valve body.

3. A piezoelectric valve as recited in claim 2, further comprising a seal position between said jam nut and said second end of said valve body.

4. A piezoelectric valve as recited in claim 1, wherein said first end of said valve body includes a threaded aperture and said threaded aperture is capable of receiving a plug having a head and a cylindrical portion, said cylindrical portion includes external threads that are engageable with said threaded aperture to secure said plug in said threaded aperture.

5. A piezoelectric valve as recited in claim 4, wherein said plug includes a threaded aperture and said first piezoelectric actuator further includes a jam nut and a hollow bolt having a head, a threaded portion and a sleeve and said piezoelectric element is receivable in said sleeve and said threaded portion is engageable with said threaded aperture in said plug and said jam nut is positionable on said threaded portion adjacent said plug to secure said first piezoelectric actuator to said plug.

6. A piezoelectric valve comprising:
   a valve body having a first end opposite a second end, a first fluid flow path through said valve body and a second fluid flow path through said valve body, an interior space defined between said first end and said second end;
   a poppet valve receivable within said interior space in a fluid tight fit and slidable within said interior space, said poppet valve having a first end opposite a second end, and said first end of said poppet valve including a first beveled surface and said second end of said poppet valve including a second beveled surface;
   a first piezoelectric actuator in contact with said first end of said poppet valve;
   a second piezoelectric actuator in contact with said second end of said poppet valve;
   wherein said poppet valve is centered in said interior space when said first piezoelectric actuator and said second piezoelectric actuator are not actuated, thereby permitting fluid flow through said first fluid flow path and said second fluid flow path and when said first piezoelectric actuator is actuated with a first electrical current expanding a piezoelectric element in said first piezoelectric actuator and said second piezoelectric actuator is actuated with a second electrical current compressing a piezoelectric element in said second piezoelectric actuator, said poppet valve is thereby shifted by said first and said second piezoelectric actuators and fluid flow is prevented through one of said first and said second fluid flow paths while increasing fluid flow through an other one of said first and said second fluid flow paths.

7. A piezoelectric valve comprising:
   a valve body having a first end opposite a second end, a first fluid flow path through said valve body and a second fluid flow path through said valve body, an interior space defined between said first end and said second end;
   a poppet valve receivable within said interior space in a fluid tight fit and slidable within said interior space, said poppet valve having a first end opposite a second end each said end including an actuator recess;

a first piezoelectric actuator in contact with said recess in said first end of said poppet valve;

a second piezoelectric actuator in contact with said recess in said second end of said poppet valve;

wherein said poppet valve is centered in said interior space when said first piezoelectric actuator and said second piezoelectric actuator are not actuated, thereby permitting fluid flow through said first fluid flow path and said second fluid flow path and when said first piezoelectric actuator is actuated with a first electrical current expanding a piezoelectric element in said first piezoelectric actuator and said second piezoelectric actuator is actuated with a second electrical current compressing a piezoelectric element in said second piezoelectric actuator, said poppet valve is thereby shifted by said first and said second piezoelectric actuators and fluid flow is prevented through one of said first and said second fluid flow paths while increasing fluid flow through an other one of said first and said second fluid flow paths.

* * * * *